US012780132B2

(12) United States Patent
Aizawa et al.

(10) Patent No.: US 12,780,132 B2
(45) Date of Patent: Nov. 3, 2026

(54) DETECTION STRUCTURE FOR VEHICLE

(71) Applicant: Honda Motor Co., Ltd., Tokyo (JP)

(72) Inventors: Hideaki Aizawa, Tokyo (JP); Motoyuki Momii, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 220 days.

(21) Appl. No.: 18/788,087

(22) Filed: Jul. 29, 2024

(65) Prior Publication Data

US 2025/0178551 A1 Jun. 5, 2025

(30) Foreign Application Priority Data

Nov. 30, 2023 (CN) ......................... 202323247736.2

(51) Int. Cl.
*B60R 19/02* (2006.01)
*B60R 19/03* (2006.01)

(52) U.S. Cl.
CPC ............ *B60R 19/023* (2013.01); *B60R 19/03* (2013.01)

(58) Field of Classification Search
CPC ....... B60R 19/02; B60R 19/023; B60R 19/03; B60R 19/483; B60R 21/0134
See application file for complete search history.

(56) References Cited

U.S. PATENT DOCUMENTS

2009/0160204 A1* 6/2009 Czopek .................. B60R 19/18 293/133
2017/0144619 A1* 5/2017 Shamoto ................ B60R 19/48
2018/0203110 A1* 7/2018 Watanabe ............... G01S 7/027

FOREIGN PATENT DOCUMENTS

CN 108303679 7/2018
CN 216994145 7/2022

* cited by examiner

*Primary Examiner* — Nicholas McFall
*Assistant Examiner* — Eric Acosta
(74) *Attorney, Agent, or Firm* — JCIPRNET

(57) ABSTRACT

A blocking component for vehicle is used in a detection structure for vehicle including a bumper beam and a detection component. The bumper beam is mounted on a vehicle to maintain a bumper of the vehicle, and has a side end portion and an opening opened at the side end portion. The detection component is mounted at an inner side portion of the vehicle and located near the side end portion of the bumper beam. The blocking component for vehicle is mounted on the side end portion of the bumper beam to block the opening. The blocking component includes: an outer peripheral edge portion abutted against the outer peripheral edge of the side end portion; and a protruding portion extended from the opening into an inside of the bumper beam. At least a portion of the protruding portion is abutted against an inner wall surface of the side end portion.

6 Claims, 7 Drawing Sheets

DETECTION STRUCTURE FOR VEHICLE

CROSS-REFERENCE TO RELATED APPLICATION

This application claims the priority benefit of China application serial no. 202323247736.2, filed on Nov. 30, 2023. The entirety of the above-mentioned patent application is hereby incorporated by reference herein and made a part of this specification.

BACKGROUND OF THE INVENTION

Field of the Invention

The invention relates to a blocking component for vehicle.

Description of Related Art

In recent years, efforts to provide access to sustainable transportation systems that also take into account vulnerable persons such as the elderly, disabled, and children among traffic participants are growing. In order to achieve the above object, research and development to further improve the safety or convenience of transportation through development related to safety improvement are carried out. However, in the development related to improving safety, the detection structure for vehicle used in autonomous driving techniques of vehicles is an issue.

In the prior art, the detection structure for vehicle may be mounted at the inside of the front or rear bumper of the vehicle and adopts a detection component such as radar to emit radio waves to the outside of the vehicle. Parameters such as the vehicle's surrounding environment are thus detected as the basis for autonomous driving. However, the inside of the bumper is equipped with highly reflective components such as bumper beams. Therefore, the radio waves emitted by the detection component may enter the hole structures of these highly reflective components after being reflected by the bumper beams, and produce random reflections in the hole structures and then return to the detection component, thus causing the situation of identification errors. In this case, even if it is desired not to mount the detection component around these highly reflective components, due to the narrow layout space of the vehicle, it is difficult to change the arrangement position of the detection component while suppressing costs.

In order to solve the above issue, the invention aims to improve safety. Moreover, traffic safety is further improved, thus contributing to the development of sustainable transportation systems.

PRIOR ART LITERATURE

Patent Literature

[Patent Literature 1]Chinese Patent Publication No. CN108303679A

SUMMARY OF THE INVENTION

The invention provides a blocking component for vehicle that may reduce identification errors caused by random reflections of a detection structure for vehicle in a low-cost manner to improve safety.

A blocking component for vehicle of the invention is used in a detection structure for vehicle, the detection structure for vehicle includes a bumper beam and a detection component, the bumper beam is mounted on a vehicle to maintain a bumper of the vehicle, and has a side end portion and an opening opened at the side end portion, and the detection component is mounted at an inner side portion of the vehicle and located near the side end portion of the bumper beam. The blocking component for vehicle is mounted on the side end portion of the bumper beam to block the opening, wherein the blocking component for vehicle includes: an outer peripheral edge portion abutted against an outer peripheral edge of the side end portion; and a protruding portion extended from the opening into an inside of the bumper beam, and at least a portion of the protruding portion is abutted against an inner wall surface of the side end portion.

In an embodiment of the invention, the bumper beam has a mounting hole located near the side end portion, the blocking component for vehicle includes a claw portion disposed at a side surface of the protruding portion, and when the blocking component for vehicle is mounted on the side end portion to block the opening, the blocking component for vehicle is engaged with the mounting hole via the claw portion.

In an embodiment of the invention, the bumper beam has a dividing plate located at an inside of the opening and dividing the opening into two portions, the blocking component for vehicle has a dividing groove located on the protruding portion and dividing the protruding portion into two portions, and the blocking component for vehicle blocks the opening in such a manner that the dividing groove correspondingly covers the dividing plate and the two portions of the protruding portion are correspondingly extended into the two portions of the opening.

In an embodiment of the invention, the blocking component for vehicle includes a recessed portion disposed at an outer side portion opposite to the protruding portion, and the recessed portion corresponds to the protruding portion, so that the blocking component for vehicle forms a cover structure composed of a plurality of sidewalls and extended toward an inside of the opening.

In an embodiment of the invention, the blocking component for vehicle is formed by a material shielding radio waves.

In an embodiment of the invention, the blocking component for vehicle is formed by a radio wave absorbing resin.

Based on the above, the blocking component for vehicle of the invention is mounted on the side end portion of the bumper beam to block the opening, wherein the blocking component for vehicle includes the outer peripheral edge portion abutted against the outer peripheral edge of the side end portion, and the protruding portion extended from the opening into the inside of the bumper beam, and at least a portion of the protruding portion is abutted against the inner wall surface of the side end portion. Therefore, compared with changing the arrangement position of the detection component, by mounting the blocking component for vehicle on the side end portion having the opening of the bumper beam, radio waves may be blocked in a low-cost manner to alleviate the phenomenon of stray reflections of the detection structure for vehicle, thereby improving safety. In addition, the blocking component for vehicle may cover the opening via a structure such as the outer peripheral edge portion and the protruding portion and be tightly combined with the opening, thereby improving practicality. Accordingly, the blocking component for vehicle of the invention may reduce identification errors caused by the phenomenon of stray reflections of the detection structure for vehicle in a low-cost manner, thereby improving safety.

In order to make the above-mentioned features and advantages of the invention more comprehensible, the following specific embodiments are described in detail with reference to the accompanying drawings.

DESCRIPTION OF THE EMBODIMENTS

Figure 1:
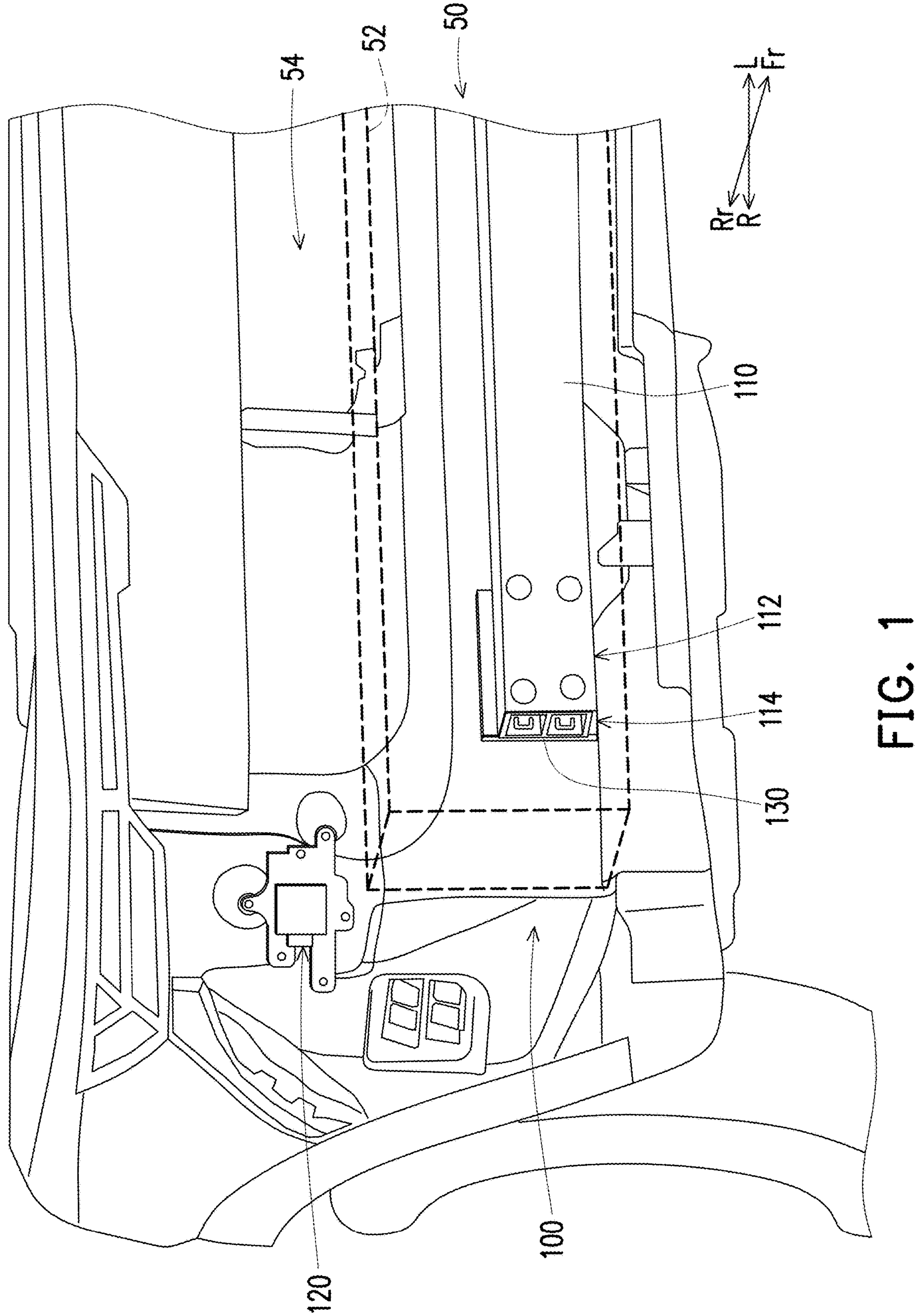
FIG. 1 is a partial perspective view of a detection structure for vehicle of a blocking component for vehicle used in a vehicle body structure of an embodiment of the invention.
Figure 2:
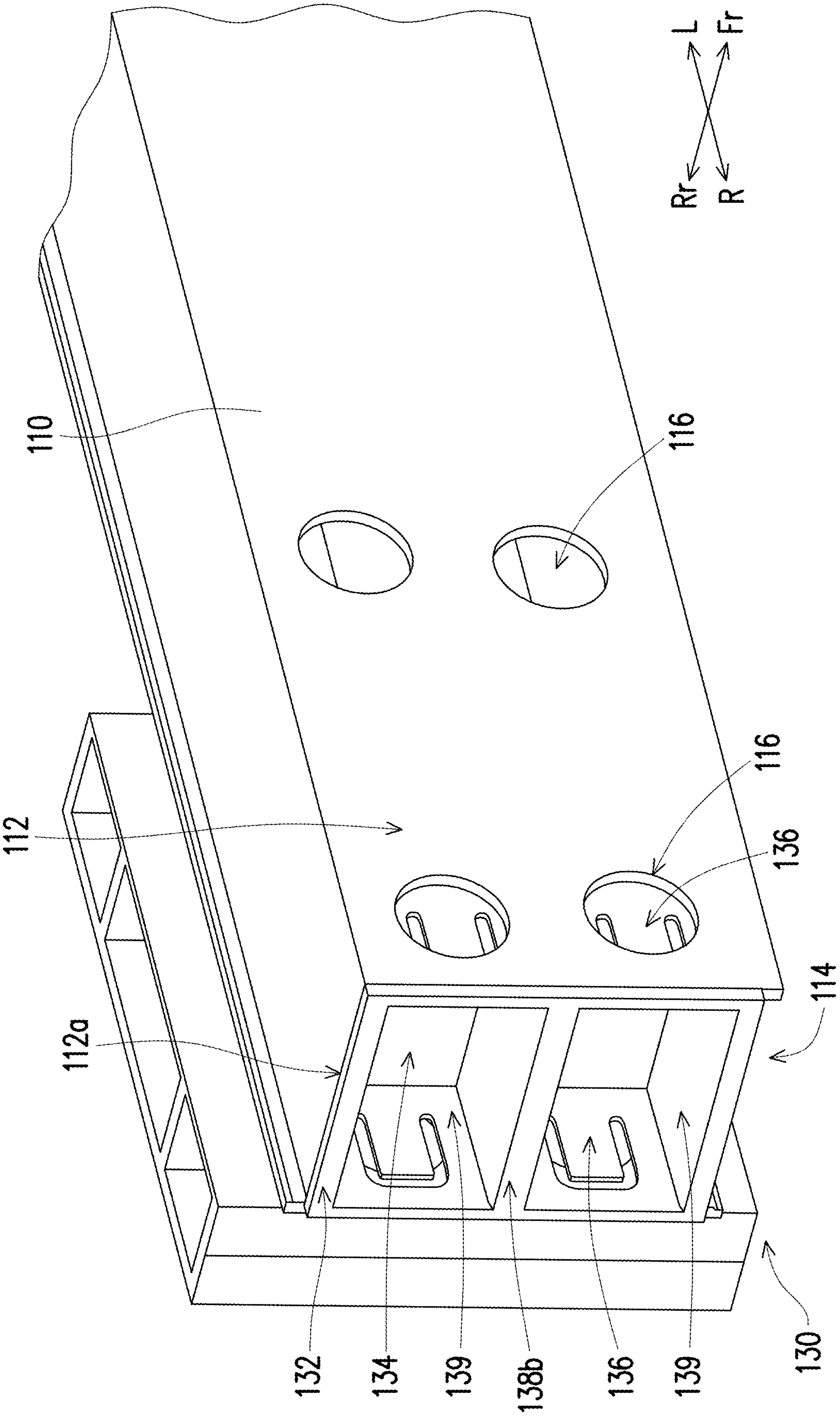
FIG. 2 is a partial enlarged schematic view of the detection structure for vehicle shown in FIG. 1 near the side end portion of the bumper beam and the blocking component for vehicle.
Figure 3:
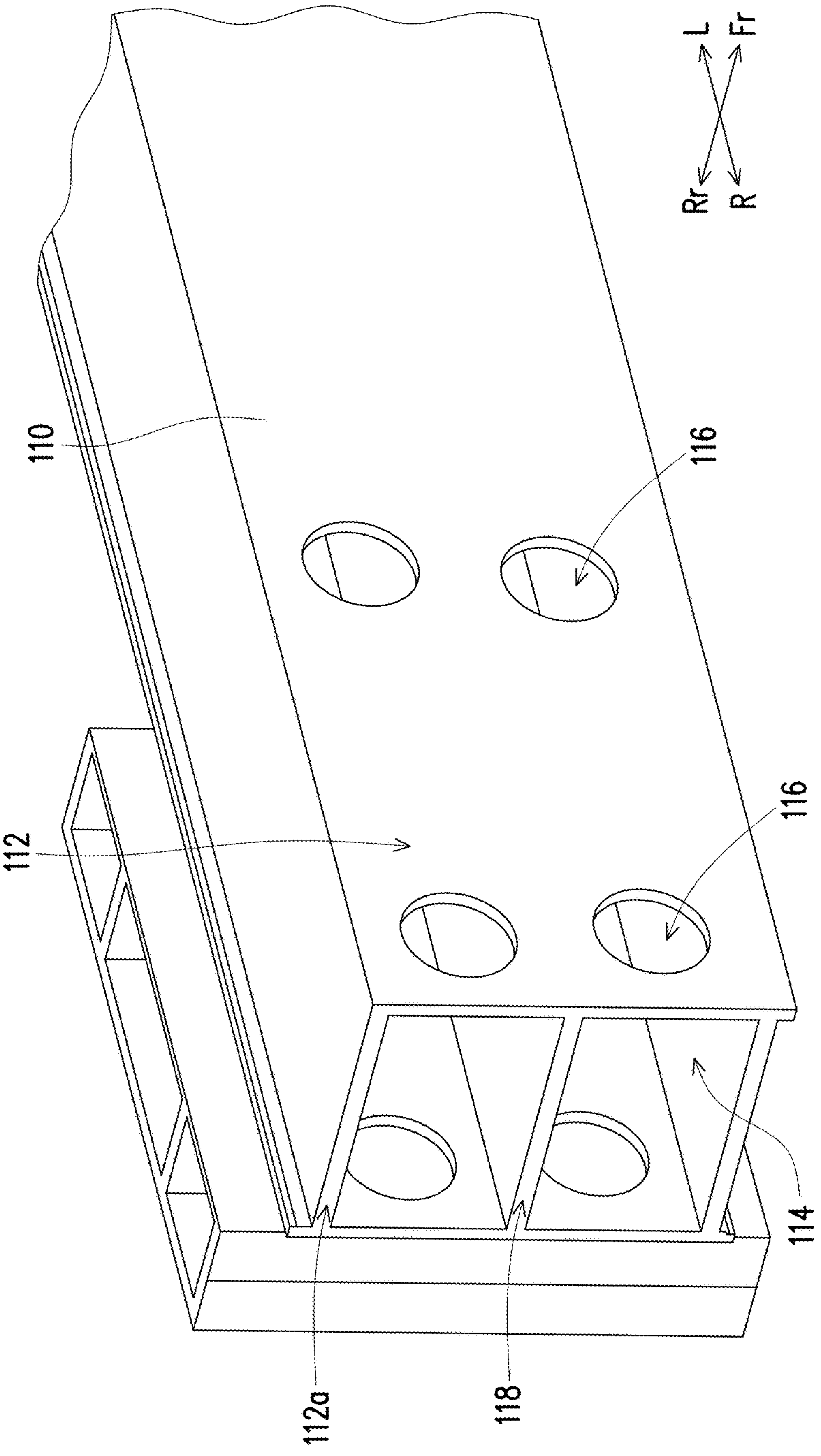
FIG. 3 is a partial enlarged schematic view of the detection structure for vehicle shown in FIG. 2 after the blocking component for vehicle is removed.
Figure 4:
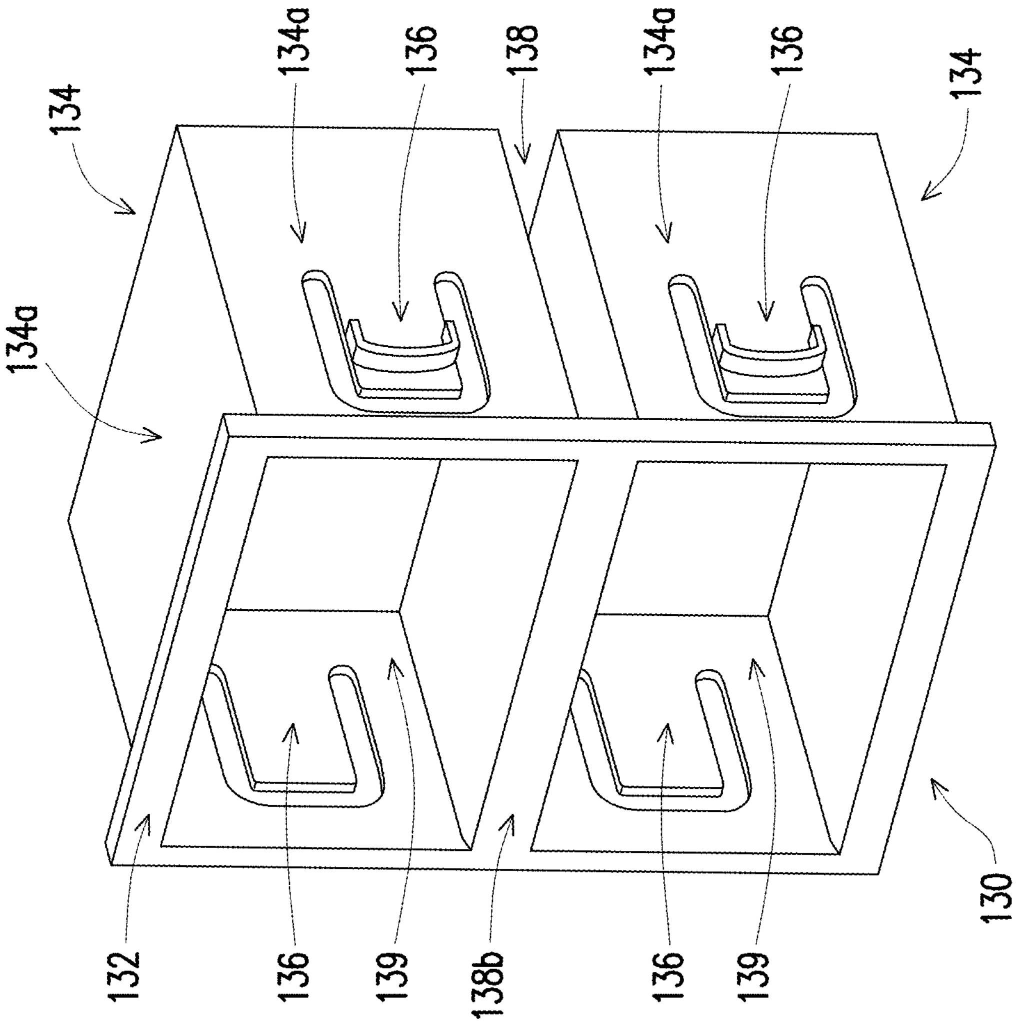
FIG. 4 is a perspective view of the blocking component for vehicle shown in FIG. 2.
Figure 5:
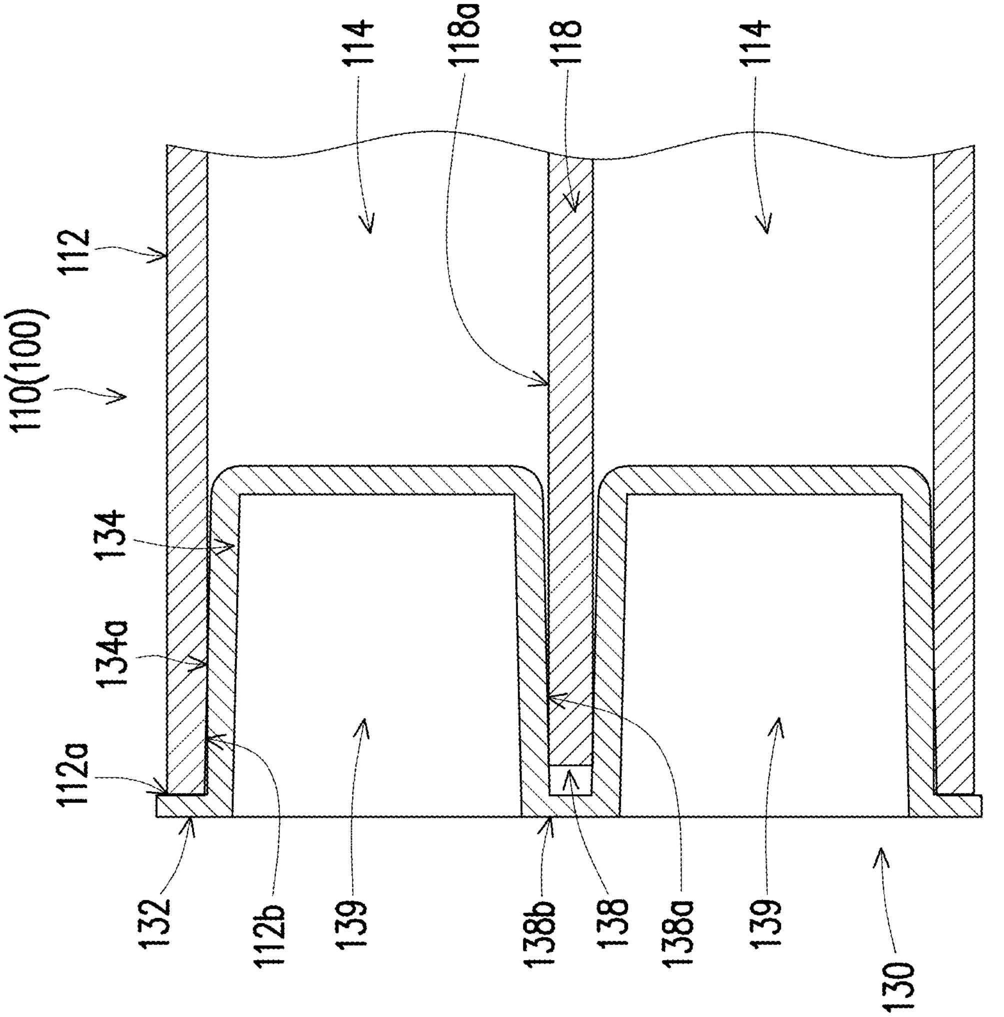
FIG. 5 is a partial cross-sectional schematic view of the blocking component for vehicle shown in FIG. 4 mounted on the side end portion of the bumper beam.
Figure 6:
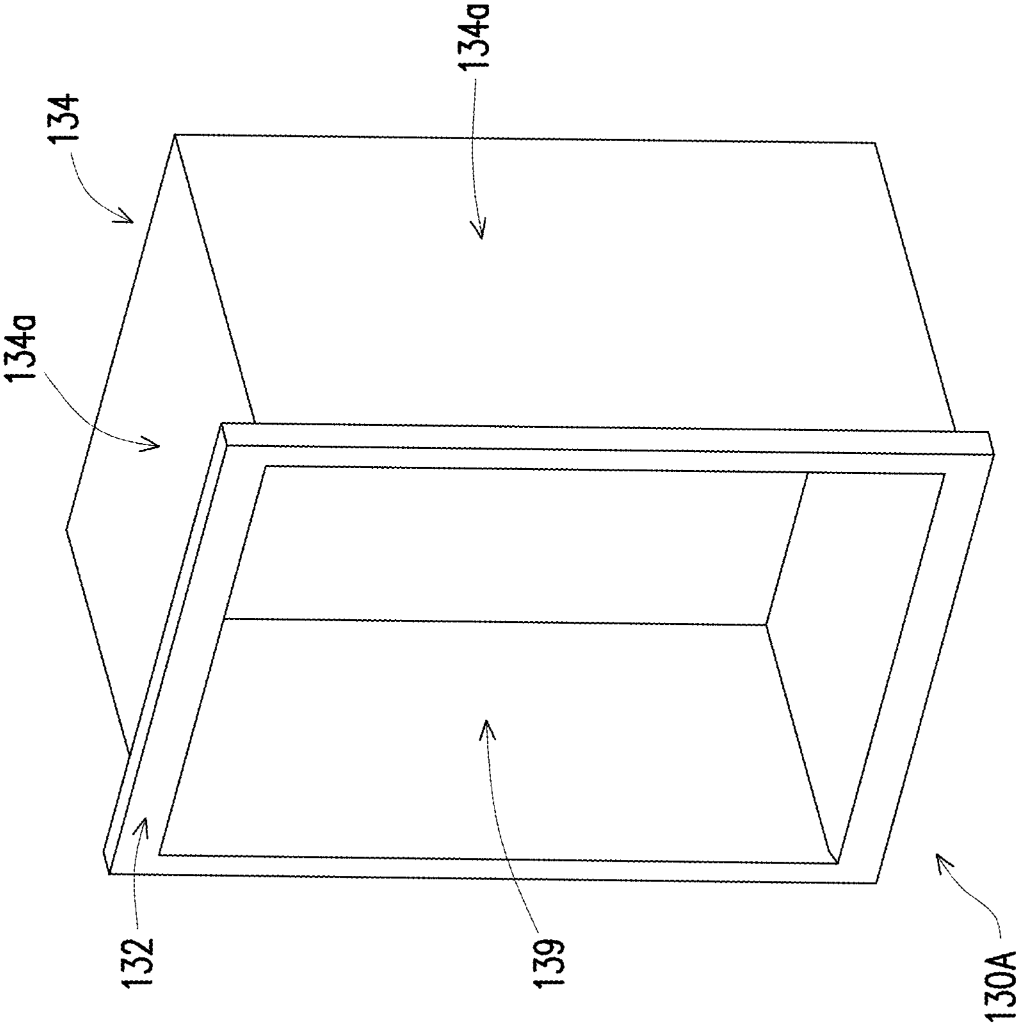
FIG. 6 and FIG. 7 are schematic perspective views of other modifications of the blocking component for vehicle shown in FIG. 4.
Figure 7:
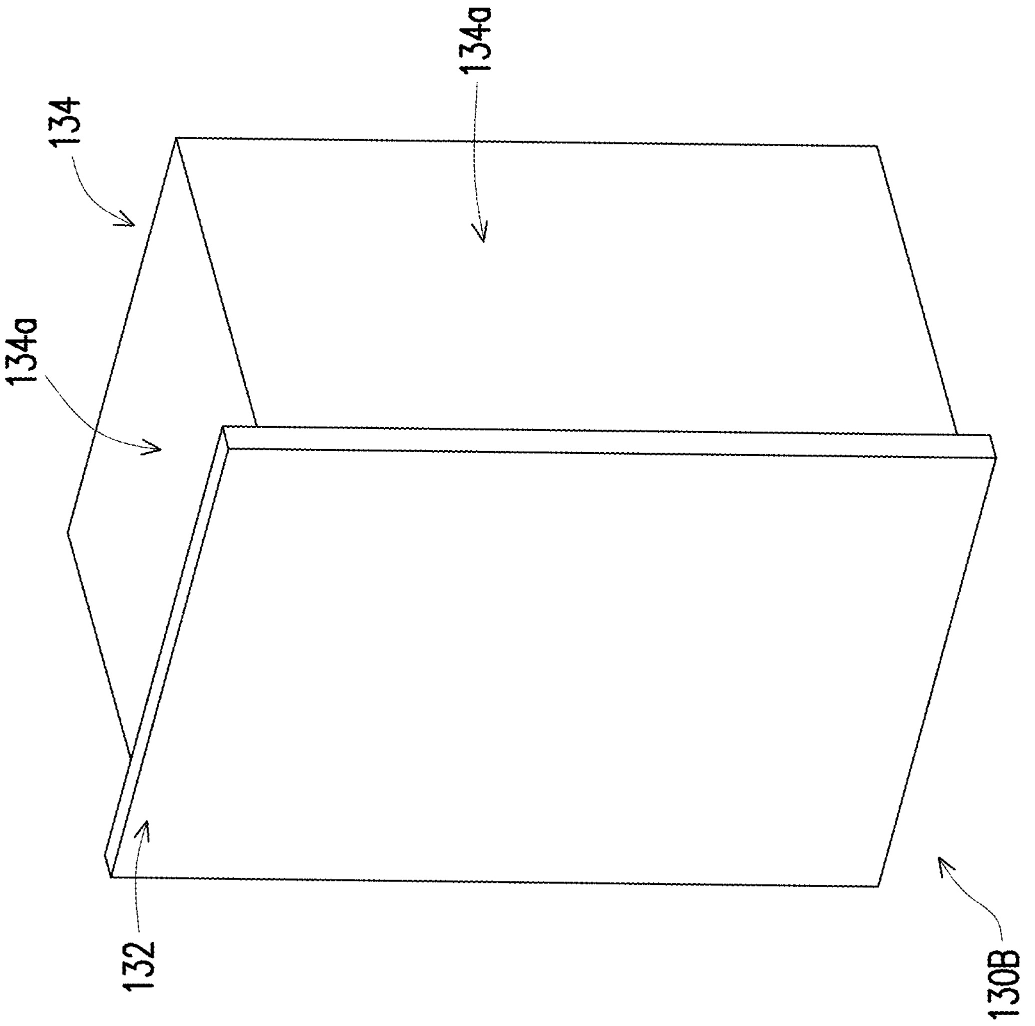

FIG. 1 is a partial perspective view of a detection structure for vehicle of a blocking component for vehicle used in a vehicle body structure of an embodiment of the invention. FIG. 2 is a partial enlarged schematic view of the detection structure for vehicle shown in FIG. 1 near the side end portion of the bumper beam and the blocking component for vehicle. FIG. 3 is a partial enlarged schematic view of the detection structure for vehicle shown in FIG. 2 after the blocking component for vehicle is removed. FIG. 4 is a perspective view of the blocking component for vehicle shown in FIG. 2. FIG. 5 is a partial cross-sectional schematic view of the blocking component for vehicle shown in FIG. 4 mounted on the side end portion of the bumper beam. FIG. 6 and FIG. 7 are schematic perspective views of other modifications of the blocking component for vehicle shown in FIG. 4. The specific composition of the blocking component for vehicle of the present embodiment and the detection structure for vehicle to which the blocking component for vehicle is applied will be described below with reference to FIG. 1 to FIG. 5, and other modified embodiments of the blocking component for vehicle will be described with reference to FIG. 6 and FIG. 7, wherein the front and rear directions described later are, for example, a front direction Fr and a rear direction Rr in the drawings, and the left and right directions are, for example, a left direction L and a right direction R in the drawings. However, this is only one example, and the invention is not limited thereto, and may be adjusted according to needs.

Please refer to FIG. 1 to FIG. 3. In the present embodiment, a detection structure 100 for vehicle is suitable for mounting at the inside of a bumper 52 of a vehicle 50 (shown with a dotted line in FIG. 1 to show the structure of the inside of the bumper 52). The bumper 52 is, for example, mounted at the front or rear of a vehicle body 54 of the vehicle 50 in the front-rear direction (shown as being mounted at the side corresponding to the front direction Fr in FIG. 1), and forms a beam structure extended in the left-right direction (that is, the left direction L and the right direction R in FIG. 1), thereby serving as a collision structure on the front end side or the rear end side of the vehicle 50. In particular, the detection structure 100 for vehicle includes a bumper beam 110 and a detection component 120. The bumper beam 110 is mounted at the vehicle 50 to maintain the bumper 52 of the vehicle 50 and has a side end portion 112 and an opening 114 opened at the side end portion 112 (as shown in FIG. 2 and FIG. 3). The detection component 120 is mounted at the inner side portion of the vehicle 50 and located near the side end portion 112 of the bumper beam 110 (as shown in FIG. 1). Furthermore, the blocking component 130 for vehicle is used in the detection structure 100 for vehicle. Furthermore, the blocking component 130 for vehicle is mounted on the side end portion 112 of the bumper beam 110 to block the opening 114 (as shown in FIG. 1 and FIG. 2).

Specifically, in the present embodiment, as shown in FIG. 1 to FIG. 3, the bumper beam 110 is, for example, mounted at the front or rear of the vehicle body 54 of the vehicle 50 in the front-rear direction (shown as being mounted at the side corresponding to the front direction Fr in FIG. 1), and forms a beam structure extended in the left-right direction (that is, the left direction L and the right direction R in FIG. 1), thereby the bumper 52 is maintained in front of the vehicle body 54 in the left-right direction. That is, the bumper beam 110 is disposed at the inside of the bumper 52 to connect the bumper 52 to the vehicle body 54. In other embodiments not shown, the bumper beam 110 may also be mounted at the rear of the vehicle body 54 of the vehicle 50 (the side corresponding to the rear direction Rr) to maintain the bumper 52 at the rear of the vehicle body 54. The present embodiment does not limit the application area of the detection structure 100 for vehicle to the front or rear of the vehicle 50, which may be adjusted according to needs.

Furthermore, in the present embodiment, as shown in FIG. 1 to FIG. 3, the detection component 120 (for example, a radar) is mounted near the bumper beam 110. FIG. 1 shows as an example that the detection component 120 is disposed at a side of the bumper beam 110 corresponding to the right direction R corresponding to the front direction Fr. In other embodiments not shown, the detection component 120 may also be disposed at a side of the bumper beam 110 corresponding to the left direction L corresponding to the front direction Fr, and may also be disposed at a side (not shown) of the bumper beam 110 corresponding to the left direction L or corresponding to the right direction R corresponding to the rear direction Rr. Preferably, the detection component 120 may be disposed at positions corresponding to the four corners of the vehicle 50. Therefore, the detection structure 100 for vehicle may emit radio waves to the outside of the vehicle 50 via the detection component 120 to detect parameters such as the surrounding environment of the vehicle 50 as a basis for autonomous driving. However, the present embodiment does not limit the number of the detection component 120 and which side of the vehicle 50 the applied area is, which may be adjusted according to needs.

Furthermore, in the present embodiment, as shown in FIG. 1 to FIG. 3, the bumper beam 110 is a beam structure having a hollow interior, and the side end portion 112 of at least one of the left and right sides (for example, the side end portion 112 corresponding to the right direction R) is provided with the opening 114 opened to the outside. Therefore, highly reflective components such as the bumper beam 110 may cause the phenomenon of random reflections due to the radio waves emitted by the detection component 120, thereby leading to the situation of identification errors. Correspondingly, the blocking component 130 for vehicle is mounted on the side end portion 112 of the bumper beam 110 to block the opening 114. In particular, as shown in FIG. 2 to FIG. 5, the blocking component 130 for vehicle includes an outer peripheral edge portion 132 and a protruding portion 134. The outer peripheral edge portion 132 is abutted against an outer peripheral edge 112*a* of the side end portion 112, the protruding portion 134 is extended from the opening 114 into the inside of the bumper beam 110, and at least a portion of the protruding portion 134 (e.g., a side surface 134*a* of the protruding portion 134) is abutted against an inner wall surface 112*b* of the side end portion 112 (as shown in FIG. 5). In other words, the blocking component 130 for vehicle is extended into the inside of the opening 114 via the protruding portion 134 and abutted against the inner wall surface 112*b* of the side end portion 112 via at least a portion of the protruding portion 134 (for example, the side surface 134*a* of the protruding portion 134) to be mounted on the side end portion 112 and block the opening 114, and the outer peripheral edge portion 132 is abutted against the outer peripheral edge 112*a* of the side end portion 112 to cover the gap between the opening 114 and the protruding portion 134 (as shown in FIG. 5).

Although FIG. 1 to FIG. 3 only show that the blocking component 130 for vehicle is mounted on the side end portion 112 of the bumper beam 110 corresponding to the right direction R to block the opening 114, when the side end portions 112 of the left and right sides of the bumper beam 110 are both mounted with the opening 114 opened to the outside (not shown), the blocking component 130 for vehicle may also be mounted on the side end portion 112 of both the left and right sides of the bumper beam 110 to fill the opening 114 of the left and right sides. Preferably, the blocking component 130 for vehicle is mounted on the side end portion 112 of the bumper beam 110 and located between the opening 114 of the bumper beam 110 and the detection component 120 to prevent the radio waves of the detection component 120 from propagating from the opening 114 toward the inside of highly reflective components such as the bumper beam 110 and alleviate the phenomenon of stray reflections of the detection structure 100 for vehicle. Therefore, compared with changing the arrangement position of the detection component 120, by mounting the blocking component 130 for vehicle on the side end portion 112 having the opening 114 of the bumper beam 110, radio waves may be blocked in a low-cost manner to alleviate the phenomenon of stray reflections of the detection structure 100 for vehicle, thereby improving safety. In addition, the blocking component 130 for vehicle may cover the opening 114 via a structure such as the outer peripheral edge portion 132 and the protruding portion 134 and be tightly combined with the opening 114, thereby improving practicality. Accordingly, the blocking component 130 for vehicle may reduce identification errors caused by the phenomenon of stray reflections of the detection structure 100 for vehicle in a low-cost manner, thereby improving safety. However, the invention is not limited thereto and may be adjusted according to needs.

Furthermore, in the present embodiment, as shown in FIG. 2 to FIG. 5, the bumper beam 110 has a mounting hole 116 located near the side end portion 112. The blocking component 130 for vehicle includes a claw portion 136 disposed at the side surface 134*a* of the protruding portion 134. Furthermore, when the blocking component 130 for vehicle is mounted on the side end portion 112 to block the opening 114, the blocking component 130 for vehicle is engaged with the mounting hole 116 via the claw portion 136. The mounting hole 116 is, for example, an opening structure opened on the sidewall of the bumper beam 110 for mounting the bumper beam 110. For example, a mounting tool (not shown) is extended into the inside of the bumper beam 110 via the mounting hole 116, and the bumper beam 110 is fixed to the vehicle body 54 using a fastener (e.g., a bolt) from the inside of the bumper beam 110. After the bumper beam 110 is fixed, the mounting tool is removed from the mounting hole 116, and the blocking component 130 for vehicle is further mounted at the side end portion 112 and engaged with the mounting hole 116 via the claw portion 136. That is, the mounting object and the engaging object of the mounting hole 116 do not interfere with each other. Therefore, the blocking component 130 for vehicle may not only be abutted against the inner wall surface 112*b* of the side end portion 112 via at least a portion of the protruding portion 134 (for example, the side surface 134*a* of the protruding portion 134), but may also be mounted on the side end portion 112 by being engaged with the mounting hole 116 via the claw portion 136, thereby increasing the stability of mounting the blocking component 130 for vehicle on the side end portion 112.

However, the mounting hole 116 is not limited to the opening structure used for the above object, and may also be used to engage the opening structure of the blocking component 130 for vehicle regardless of the mounting of the bumper beam 110. Moreover, in other modifications as shown in subsequent FIG. 6 and FIG. 7, alternatively, the claw portion 136 may be omitted at the side surface 134*a* of the protruding portion 134, and instead only a portion of the protruding portion 134 (for example, the side surface 134*a* of the protruding portion 134) is abutted against the inner wall surface 112*b* of the side end portion 112 as a mounting mechanism. Alternatively, the blocking component 130 for vehicle may also be fixed on the side end portion 112 using other fixing methods not shown. As long as the blocking component 130 for vehicle may be mounted on the side end portion 112 of the bumper beam 110 to block the opening 114, the invention is not limited in this regard.

Furthermore, in the present embodiment, as shown in FIG. 2 to FIG. 5, the bumper beam 110 has a dividing plate 118 located at the inside of the opening 114 to divide the opening 114 into two portions. The blocking component 130 for vehicle has a dividing groove 138 located on the protruding portion 134 and dividing the protruding portion 134 into two portions. Furthermore, the blocking component 130 for vehicle blocks the opening 114 in such a manner that the dividing groove 138 correspondingly covers the dividing plate 118 and the two portions of the protruding portion 134 are correspondingly extended into the two portions of the opening 114 (as shown in FIG. 5). The dividing plate 118 is, for example, a reinforcing plate in a hollow portion of the bumper beam 110, and is extended within the bumper beam 110 to divide the opening 114 into two portions. Therefore, the blocking component 130 for vehicle may not only be mounted on the side end portion 112 to block the opening 114, but may also adjust the shape of the extended portion (that is, the protruding portion 134) of the blocking component 130 for vehicle according to the structure near the opening 114 (for example, the arrangement of the dividing plate 118) to ensure the extending range of the protruding portion 134 of the blocking component 130 for vehicle (corresponding to the abutting range of at least a portion of the protruding portion 134 and the inner wall surface 112*b* of the side end portion 112). Therefore, the stability of mounting the blocking component 130 for vehicle on the side end portion 112 may be increased. Preferably, the inner surface 138*a* of the dividing groove 138 is abutted against the surface 118*a* of the dividing plate 118, thereby further increasing the abutting effect of the protruding portion 134 and the side end portion 112, but is not limited thereto.

However, in other modifications as shown in subsequent FIG. 6 and FIG. 7, instead of disposing the dividing groove 138 on the protruding portion 134, the protruding portion 134 may be provided so as to avoid the dividing plate 118 (that is, the extending range of the protruding portion 134 is adjusted). Alternatively, the side end portion 112 of the bumper beam 110 may also be not provided with the dividing plate 118, and whether the matching blocking component 130 for vehicle is provided with the dividing groove 138 may be adjusted according to needs. As long as the protruding portion 134 of the blocking component 130 for vehicle may be extended from the opening 114 into the inside of the bumper beam 110, so that the blocking component 130 for vehicle may be mounted on the side end portion 112 of the bumper beam 110 to block the opening 114, the invention is not limited in this regard.

Furthermore, in the present embodiment, as shown in FIG. 2 to FIG. 5, the blocking component 130 for vehicle includes a recessed portion 139 disposed at an outer side portion opposite to the protruding portion 134. The recessed portion 139 corresponds to the protruding portion 134, so that the blocking component 130 for vehicle forms a cover structure composed of a plurality of sidewalls and extended toward the inside of the opening 114. That is, when the blocking component 130 for vehicle is provided with the dividing groove 138 to divide the protruding portion 134 into two portions, the outer portion of the blocking component 130 for vehicle is also provided with two recessed portions 139, so that the blocking component 130 for vehicle forms a thinner cover structure, and the protruding portion 134 forms a hollow protruding structure. Preferably, the outer portion of the partition groove 138 forms a rib portion 138*b* located between the two recessed portions 139 and is at the same plane as the outer peripheral edge portion 132 (i.e., the outer side surface of the blocking component 130 for vehicle). In this way, the blocking component 130 for vehicle may not only be mounted on the side end portion 112 to block the opening 114, but may also reduce the volume, thereby reducing manufacturing cost. However, in other modifications as shown in subsequent FIG. 6, when the protruding portion 134 is not divided into two portions (that is, the dividing groove 138 is not provided), it is also possible to provide only one recessed portion 139 to form a thinner cover structure. Alternatively, in other modifications as shown in subsequent FIG. 7, the recessed portion 139 may also be omitted so as to form a solid block structure. When the dividing groove 138 is provided to divide the protruding portion 134 into two portions, the recessed portion 139 may also be omitted so as to form two solid block structures (not shown). As long as the blocking component 130 for vehicle may be mounted on the side end portion 112 of the bumper beam 110 to block the opening 114, the invention is not limited in this regard.

Therefore, the main difference between a blocking component 130A for vehicle in the modification of FIG. 6 and the blocking component 130 for vehicle of FIG. 4 is that: the blocking component 130A for vehicle is not provided with the claw portion 136 at the side surface 134*a* of the protruding portion 134, and instead only at least a portion of the protruding portion 134 (for example, the side surface 134*a* of the protruding portion 134) is abutted against the inner wall surface 112*b* of the side end portion 112 as a mounting mechanism. Furthermore, the blocking component 130A for vehicle is not provided with the dividing groove 138 on the protruding portion 134, and only one recessed portion 139 is provided, so that the blocking component 130A for vehicle forms a thinner cover structure. However, in the modification of FIG. 6, the claw portion 136 may also be disposed at the side surface 134*a* of the protruding portion 134, or fixed on the side end portion 112 by other fixing means. As long as the blocking component 130A for vehicle may be mounted on the side end portion 112 of the bumper beam 110 to block the opening 114, the invention is not limited in this regard.

Similarly, the main difference between a blocking component 130B for vehicle in the modification of FIG. 7 and the blocking component 130 for vehicle of FIG. 4 is that: the blocking component 130B for vehicle is not provided with the claw portion 136 at the side surface 134*a* of the protruding portion 134, and instead only at least a portion of the protruding portion 134 (for example, the side surface 134*a* of the protruding portion 134) is abutted against the inner wall surface 112*b* of the side end portion 112 as a mounting mechanism. Furthermore, the blocking component 130B for vehicle is not provided with the dividing groove 138 on the protruding portion 134, and the recessed portion 139 is omitted, so that the blocking component 130B for vehicle forms a solid block structure. However, in the modification of FIG. 7, the claw portion 136 may also be disposed at the side surface 134*a* of the protruding portion 134, or fixed on the side end portion 112 by other fixing means. As long as the blocking component 130B for vehicle may be mounted on the side end portion 112 of the bumper beam 110 to block the opening 114, the invention is not limited in this regard.

In addition, in the present embodiment, the blocking component 130 for vehicle is mounted on the side end portion 112 of the bumper beam 110 to block the opening 114 in order to achieve the object of blocking radio waves. Therefore, it is preferable that the blocking component 130 for vehicle is formed by a material shielding radio waves. The shielding of radio waves includes a method such as reflecting radio waves, absorbing radio waves, etc. that may further block the radio waves near the side end portion 112, thereby alleviating the situation of identification errors caused by random reflections of the detection structure 100 for vehicle. As a material for shielding radio waves, the blocking component 130 for vehicle may be formed using a metal plate. As a material absorbing radio waves, a radio wave absorbing resin may be used.

Considering that it is preferable to mount the blocking component 130 for vehicle on the side end portion of the bumper beam to cover the opening, it is preferable that the blocking component 130 for vehicle is formed by a radio wave absorbing resin. In this way, the blocking component 130 for vehicle may not only effectively absorb radio waves to block the radio waves near the side end portion 112, the resin material may also be tightly abutted against the inner wall surface 112*b* of the side end portion 112 when blocking the opening 114 using the compressibility characteristics of the resin material. Similarly, the blocking component 130A for vehicle shown in FIG. 6 and the blocking component 130B for vehicle shown in FIG. 7 may also be formed by a radio wave absorbing resin. However, when the blocking component 130 for vehicle is provided with the claw portion 136 to be engaged with the mounting hole 116, or is fixed on the side end portion 112 using other fixing methods, the blocking component 130 for vehicle does not need to be mounted on the side end portion 112 using the compressibility characteristics of the resin material. Therefore, the blocking component 130 for vehicle may be made of a material shielding radio waves (for example, a metal plate) other than a resin material. The invention does not limit the material composition and specific structure of the blocking component 130 for vehicle, which may be adjusted according to needs.

Based on the above, the blocking component for vehicle of the invention is mounted on the side end portion of the bumper beam to block the opening, wherein the blocking component for vehicle includes the outer peripheral edge portion abutted against the outer peripheral edge of the side end portion, and the protruding portion extended from the opening into the inside of the bumper beam, and at least a portion of the protruding portion is abutted against the inner wall surface of the side end portion. Preferably, the bumper beam has the mounting hole located near the side end portion, the blocking component for vehicle includes the claw portion disposed at the side surface of the protruding portion, and when the blocking component for vehicle is mounted on the side end portion to block the opening, the blocking component for vehicle is engaged with the mounting hole via the claw portion. Therefore, compared with changing the arrangement position of the detection component, by mounting the blocking component for vehicle on the side end portion having the opening of the bumper beam, radio waves may be blocked in a low-cost manner to alleviate the phenomenon of stray reflections of the detection structure for vehicle, thereby improving safety. In addition, the blocking component for vehicle may cover the opening via a structure such as the outer peripheral edge portion and the protruding portion and be tightly combined with the opening, thereby improving practicality. Accordingly, the blocking component for vehicle of the invention may reduce identification errors caused by the phenomenon of stray reflections of the detection structure for vehicle in a low-cost manner, thereby improving safety.

Lastly, it should be noted that the above embodiments are used to describe the technical solution of the invention instead of limiting it. Although the invention has been described in detail with reference to each embodiment above, those having ordinary skill in the art should understand that the technical solution recited in each embodiment above may still be modified, or some or all of the technical features thereof may be equivalently replaced. These modifications or replacements do not make the essence of the corresponding technical solutions depart from the scope of the technical solution of each embodiment of the invention.

What is claimed is:

1. A detection structure for vehicle, comprising:

a bumper beam mounted on a vehicle to maintain a bumper of the vehicle, and has a side end portion and an opening opened at the side end portion;

a detection component mounted at an inner side portion of the vehicle and disposed at a side of the bumper beam corresponding to the side end portion of the bumper beam; and a blocking component for vehicle mounted on the side end portion of the bumper beam to block the opening, wherein the blocking component for vehicle comprises:

an outer peripheral edge portion abutted against an outer peripheral edge of the side end portion; and a protruding portion extended from the opening into an inside of the bumper beam, the outer peripheral edge portion is abutted against the entire outer peripheral edge of the side end portion to cover a gap between the opening and the protruding portion, and at least a portion of the protruding portion is abutted against an inner wall surface of the side end portion.

2. The detection structure for vehicle of claim 1, wherein, the bumper beam has a mounting hole located at the side end portion, the blocking component for vehicle comprises a claw portion disposed at a side surface of the protruding portion, when the blocking component for vehicle is mounted on the side end portion to block the opening, the blocking component for vehicle is engaged with the mounting hole via the claw portion.

3. The detection structure for vehicle of claim 1, wherein, the bumper beam has a dividing plate located at an inside of the opening and dividing the opening into two portions, the blocking component for vehicle has a dividing groove located on the protruding portion and dividing the protruding portion into two portions, the blocking component for vehicle blocks the opening in such a manner that the dividing groove correspondingly covers the dividing plate and the two portions of the protruding portion are correspondingly extended into the two portions of the opening.

4. The detection structure for vehicle of claim 1, wherein, the blocking component for vehicle comprises a recessed portion disposed at an outer side portion opposite to the protruding portion, the recessed portion corresponds to the protruding portion, so that the blocking component for vehicle forms a cover structure composed of a plurality of sidewalls and extended toward an inside of the opening.

5. The detection structure for vehicle of claim 1, wherein, the blocking component for vehicle is formed by a material shielding radio waves.

6. The detection structure for vehicle of claim 5, wherein, the blocking component for vehicle is formed by a radio wave absorbing resin.

* * * * *